(12) United States Patent
Phelps, Sr.

(10) Patent No.: US 9,816,400 B1
(45) Date of Patent: Nov. 14, 2017

(54) PROCESS AND METHOD USING LOW TEMPERATURE SOURCES TO PRODUCE ELECTRIC POWER AND DESALINATE WATER

(71) Applicant: Calvin Eugene Phelps, Sr., Easton, PA (US)

(72) Inventor: Calvin Eugene Phelps, Sr., Easton, PA (US)

( * ) Notice: Subject to any disclaimer, the term of this patent is extended or adjusted under 35 U.S.C. 154(b) by 47 days.

(21) Appl. No.: 15/053,802

(22) Filed: Feb. 25, 2016

(51) Int. Cl.

| | |
|---|---|
| *F01K 23/04* | (2006.01) |
| *F01K 17/04* | (2006.01) |
| *F01K 11/02* | (2006.01) |
| *F24J 3/08* | (2006.01) |
| *F03G 6/00* | (2006.01) |
| *C02F 1/04* | (2006.01) |
| *C02F 1/16* | (2006.01) |
| *C02F 103/08* | (2006.01) |
| *F01K 7/32* | (2006.01) |
| *F03G 7/05* | (2006.01) |
| *F01K 25/10* | (2006.01) |
| *F01K 7/22* | (2006.01) |
| *F28B 9/10* | (2006.01) |

(52) U.S. Cl.
CPC .............. *F01K 17/04* (2013.01); *C02F 1/041* (2013.01); *C02F 1/16* (2013.01); *F01K 11/02* (2013.01); *F03G 6/003* (2013.01); *F24J 3/08* (2013.01); *C02F 2103/08* (2013.01); *C02F 2303/10* (2013.01); *F01K 7/22* (2013.01); *F01K 7/32* (2013.01); *F01K 23/04* (2013.01); *F01K 25/103* (2013.01); *F03G 7/05* (2013.01); *F28B 9/10* (2013.01); *Y02E 10/10* (2013.01); *Y02E 10/40* (2013.01)

(58) Field of Classification Search
CPC ... F01K 7/22; F01K 7/32; F01K 9/006; F01K 23/04; F01K 25/103; F03G 7/04; F03G 7/05; Y02E 10/10; Y02E 10/40; F28B 9/10
USPC .... 60/641.2, 641.8, 647, 651, 653, 655, 671
See application file for complete search history.

(56) References Cited

U.S. PATENT DOCUMENTS

| | | | | |
|---|---|---|---|---|
| 4,093,868 A | * | 6/1978 | Manning ................. | F01K 9/003 237/13 |
| 2013/0263594 A1 | * | 10/2013 | Hall ...................... | F01K 23/065 60/615 |
| 2015/0376801 A1 | * | 12/2015 | Bairamijamal ...... | B01D 53/002 204/257 |

* cited by examiner

*Primary Examiner* — Jorge Leon, Jr.

(57) ABSTRACT

A unique method and ternary cycle process that captures heat from low temperature sources currently considered not commercially usable to produce electricity and desalinate water. In one cycle a novel flash tower operating at vacuum pressure causes a fraction of low temperature water to flash into steam. The steam passes to an indirect heat exchanger with a circulating refrigerating agent such as $CO_2$, which condenses the steam on its outside surfaces to produce desalinated water product. The steam heat of condensation vaporizes the refrigerating agent, which is part of a binary refrigerate cycle that uniquely conditions it for turbine expansion to produce electricity in a connected electric generator.

12 Claims, 4 Drawing Sheets

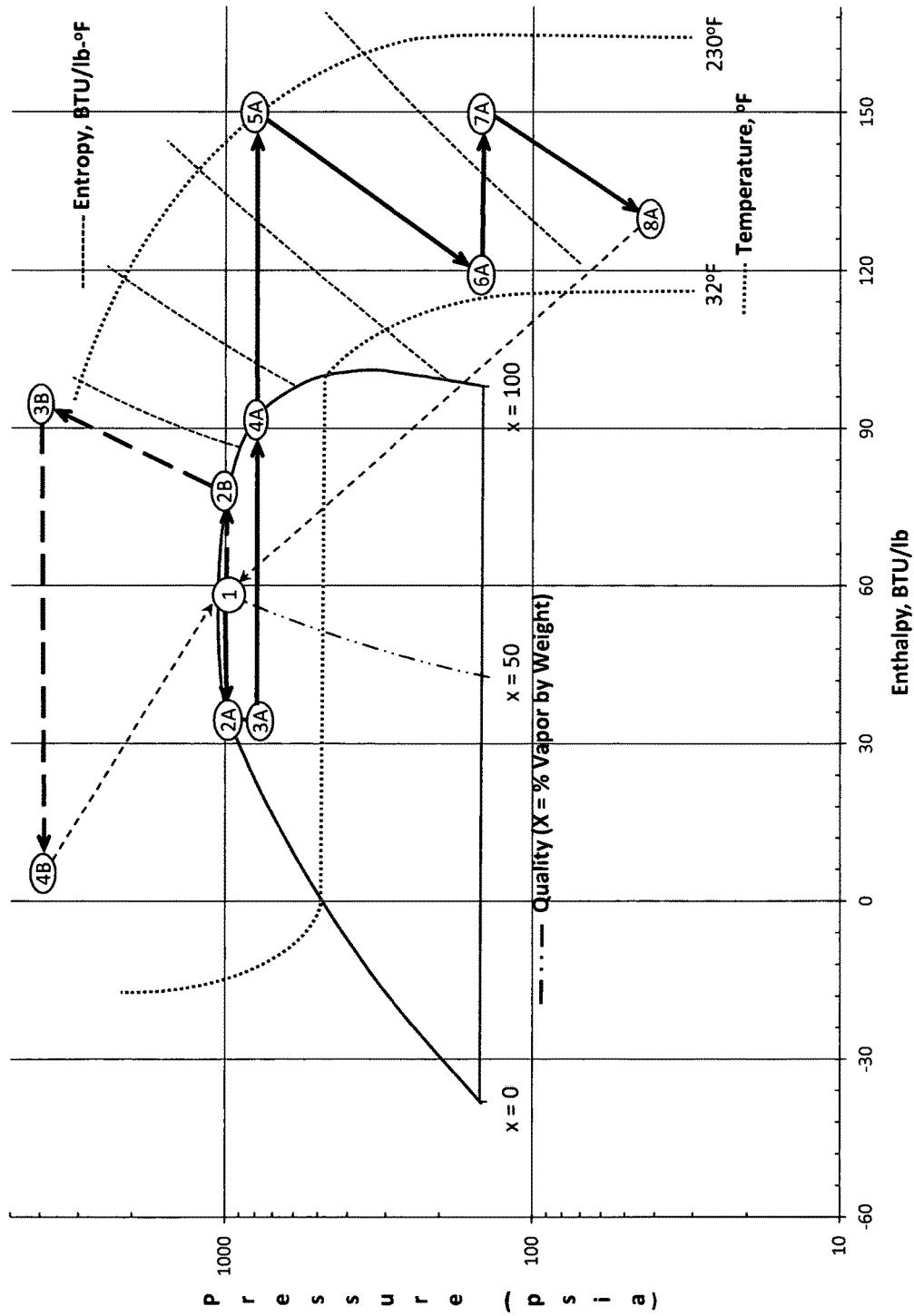
FIGURE 3, P-H Diagram for $CO_2$

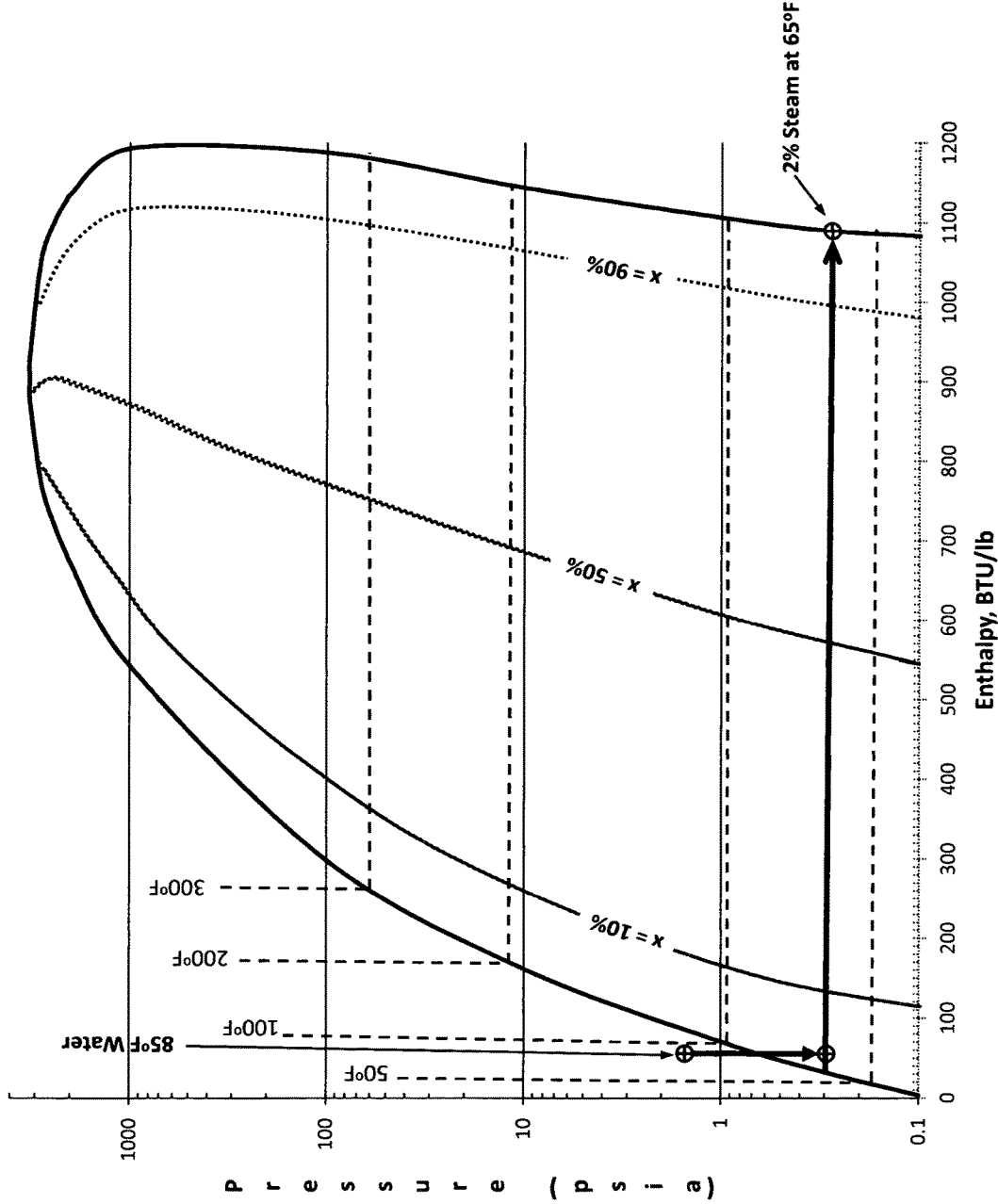
FIGURE 4, P-H DIAGRAM FOR SATURATED WATER-STEAM

PROCESS AND METHOD USING LOW TEMPERATURE SOURCES TO PRODUCE ELECTRIC POWER AND DESALINATE WATER

RELATED APPLICATION

This application claims priority as a continuation-in-part of U.S. Provisional Patent Application No. 62/120,940, entitled "Ternary Cycle Heat Recovery From Low Temperature Sources", filed Feb. 26, 2015.

BACKGROUND OF THE INVENTION

1. Field of the Invention

Specifically, the present invention is a process to capture energy from available heat sources, heretofore not considered commercially attainable because of their low temperature levels. An indirect heat exchanger facilitates heat transfer from these low temperature sources to a refrigerating agent that enters the exchanger as a lower temperature sub-cooled liquid or saturated condition and exits it as a vapor. The vapor is then uniquely superheated to condition it for turbine expansion and to produce electricity in a connected generator.

Heat may be extracted from renewable energy sources such as solar heated water in tropical or desert areas, or from geothermal spots. Heat may be extracted from power plant condenser rejected heat or stack gas waste heat. Heat may be extracted from any available source, leaving the source at a lower temperature level.

This process can serve as a stand-alone plant or be integrated with a power plant to recover rejected heat from the plant's condenser and stack gas to significantly improve plant thermal efficiency. A conventional steam power plant using the Rankine Cycle rejects approximately 55% of the fuel heat input in the condenser and 10% from the stack, resulting in a plant thermal efficiency of 35-40%. This process can increase plant thermal efficiency up to 70%.

Another feature of this process includes its capability to produce a combination of electrical power and desalinated water, by including a unique steam flash tower with a top-mounted tube and shell condenser. Non-potable water such as sea or brackish water is introduced to the flash tower for vacuum distillation with the remaining water returned to its source at a lower temperature. The flashed steam is then condensed on the outside tube surfaces of the condenser to produce potable water and to maintain flash tower vacuum pressure. The steam heat of condensation is transferred to a refrigerating agent circulating inside the tubes to vaporize it and then produce electrical power as described above.

This process allows greater flexibility in new power plant location since it provides independence from a cooling water source. It is an economical replacement for a typical plant's cooling tower, which discharges rejected heat into the atmosphere, consumes large amounts of expensive water, and may create condensate drift problems. It would not be necessary for plants to return rejected heat in cooling water to its source, mitigating environmental bio-equilibrium problems. Plant seasonal load variations caused by changing cooling water or air temperatures are prevented since a consistently low water temperature is returned to the condenser all year. Alternately, greater plant revenues may be realized by selling condenser cooling water BTU's as a product.

Integrating this process with a Rankine cycle steam power plant can produce a significant increase in electrical output using the recovered rejected heat from the plant condenser. In addition, significant desalinated water output can be produced, which is environmentally friendly. Current desalination plants have high capital investments, high operating and maintenance costs, and leave a mark on the environment.

Retrofitting this process to existing plants can significantly increase plant thermal efficiencies, reduce fuel costs, and reduce stack emissions without adding air pollution equipment. Revenues can be generated from sales of electricity, desalinated water, or cooling water BTU's. Power output from less efficient plants can be proportionally reduced with corresponding credit for reductions in emission of pollutants and carbon dioxide ($CO_2$), without requiring the addition of high cost pollution collection equipment. Receiving of operating permits, monitoring of water discharge temperature for limit violations or load reductions, water intake fouling problems, environmental bio-equilibrium impacts, and forced load reductions during peak summer demand seasons would no longer be issues. Power plant efficiency can significantly improve by returning the cooling water to the plant condenser at a lower temperature than it receives through existing cooling equipment, producing more power output.

2. Prior Art Description

Current power plants operating on the Rankine cycle primarily uses condenser cooling water from nearby sources and cooling towers to reject low temperature energy causing low plant thermal efficiencies. Dissipation of condenser rejected heat from power plants is an environmental issue and various other ideas have been discussed such as using irrigation canals and holding ponds. Prior art has not disclosed a process that efficiently uses low temperature water as an energy source on a commercial scale.

This disclosed process can be applied in geothermal power plants, resulting in significantly higher thermal efficiencies of about 50% rather than currently demonstrated efficiencies of 7 to 10%. Application in tropical or desert areas would provide essential resources and greater outputs would be realized from sea water heated solar ponds. The capacity factor for this renewable energy process would be significantly higher than demonstrated with wind or solar cell energy.

Other than hydropower and geothermal, prior art has not disclosed an economical system to produce large amounts of renewable, clean electricity in a compact source at more locations. This disclosure includes these attributes.

SUMMARY OF THE INVENTION

This specification includes two applications for this innovative process as outlined below:

1. The first application integrates this process with a new or existing power plant to generate additional electric power by substituting a refrigerate condenser for the normal water or air cooled condenser to capture condenser rejected heat, and including a refrigeration loop to capture stack gas heat in an indirect heat exchanger. The refrigerate is vaporized by these rejected heats and then uniquely conditioned to produce electric power.

2. The second application integrates this process with a power plant, using the normal cooling water condenser with its cooling water discharge redirected to a unique vacuum flash tower to capture its rejected heat. The flash tower generated steam is condensed on a refrigerate condenser producing desalinated water and its heat of condensation providing input to vaporize the refrigerate, which is then uniquely conditioned to produce electrical power.

This invention consists of a ternary-cycle process, including a refrigerating agent with inherent capabilities of vaporizing at low temperature used in two concurrent cycles to produce work, and a third cycle such as a water-steam cycle to provide heat input. Since organic refrigerates are costly and environmentally unfriendly, carbon dioxide ($CO_2$) agent is used as an example in this disclosure. $CO_2$ is safely removed from the environment and provides a non-toxic workplace environment.

The first $CO_2$ cycle (path A) operates at sub-critical pressure, initially driven by a startup pump located in the tank storage area. Path A receives low temperature heat input from an indirect heat exchanger (evaporator), entering it as a sub-cooled liquid or saturated mixture condition and discharging as a saturated vapor. Heat input to the evaporator is provided from a low temperature heat source. Path A discharges from the evaporator as a vapor and is superheated in downstream indirect heat exchangers by the second $CO_2$ cycle (Path B). Path A is expanded through turbines with connected generators to produce electricity before exhausting as a low pressure superheated vapor.

The second $CO_2$ cycle (path B) receives subcritical saturated vapor and compresses it to supercritical pressure. The heat of compression (HOC) superheats path B, converting it to supercritical pressure-temperature fluid. Path B separated into two mass flow streams transfers its heat to path A in two stages of indirect heat exchangers, thereby uniquely superheating path A vapor to condition it for turbine expansion. As detailed below, the power consumption to compress path B is significantly less than the power produced by path A expansion.

Path B discharges from the exchangers, recombines, and discharges into an ejector as the motive stream to draw path A from the reheat turbine exhaust. Combined paths A and B mix in the ejector, compress path A, and discharge to a liquid-vapor separator, resulting in a saturated mixture of about 25% of path B inlet pressure, dependent on the ejector design. Assuming a 50% quality mixture, path A and B split into two equal mass flow streams from the separator. The top outlet of the separator discharges saturated vapor to the compressor to complete path B cycle. The bottom outlet of the separator discharges saturated liquid to a throttling valve, which controls inlet temperature to the evaporator, completing path A cycle.

During startup, path B receives subcritical pressure vapor from path A via a full turbine bypass and compresses it to supercritical pressure using a startup electric motor drive. After the vapor supply to the compressor is assumed by the separator and turbine startup temperature is achieved, turbine bypass flow is redirected through the superheat turbine and subsequent reheat exchanger and turbine placing them on line with their electric generators. The compressor may then be switched from its startup electric motor drive to turbine drive via hydraulic couplings and the compressor in path B takes over as the driving force for both path A and B.

The ejectors significantly reduce compressor power consumption since compression of path B starts from separator outlet pressure and not path A reheat turbine exhaust pressure. Additionally, isentropic compression occurs in the region on the pressure-enthalpy (P-H) diagram with nearly vertical isentrope lines as compared to the less vertical isentropic lines in the turbine expansion region, which helps minimize compressor power consumption.

The third cycle that provides heat input to the process is captured from low temperature sources currently considered not to be commercially available, and rejected heat by the Rankine cycle in a steam power plant is a prime example of this. This rejected heat may be captured as demonstrated by this disclosure, along with other available sources. Application 1 shows capturing of rejected heat directly from the low pressure turbine exhaust and stack gas. Application 2 shows capturing of rejected heat from the condenser cooling water.

BRIEF DESCRIPTION OF THE DRAWINGS

FIG. 3 is a $CO_2$ P-H diagram with English Units (referenced from 32° F.) marked to show the $CO_2$ binary cycle conditions and the basis of FIGS. 1 and 2.

FIG. 4 shows a water and steam pressure-enthalpy (P-H) diagram, marked with a solid black line to show the conditions for this cycle.

DETAILED DESCRIPTION

Figure 1:
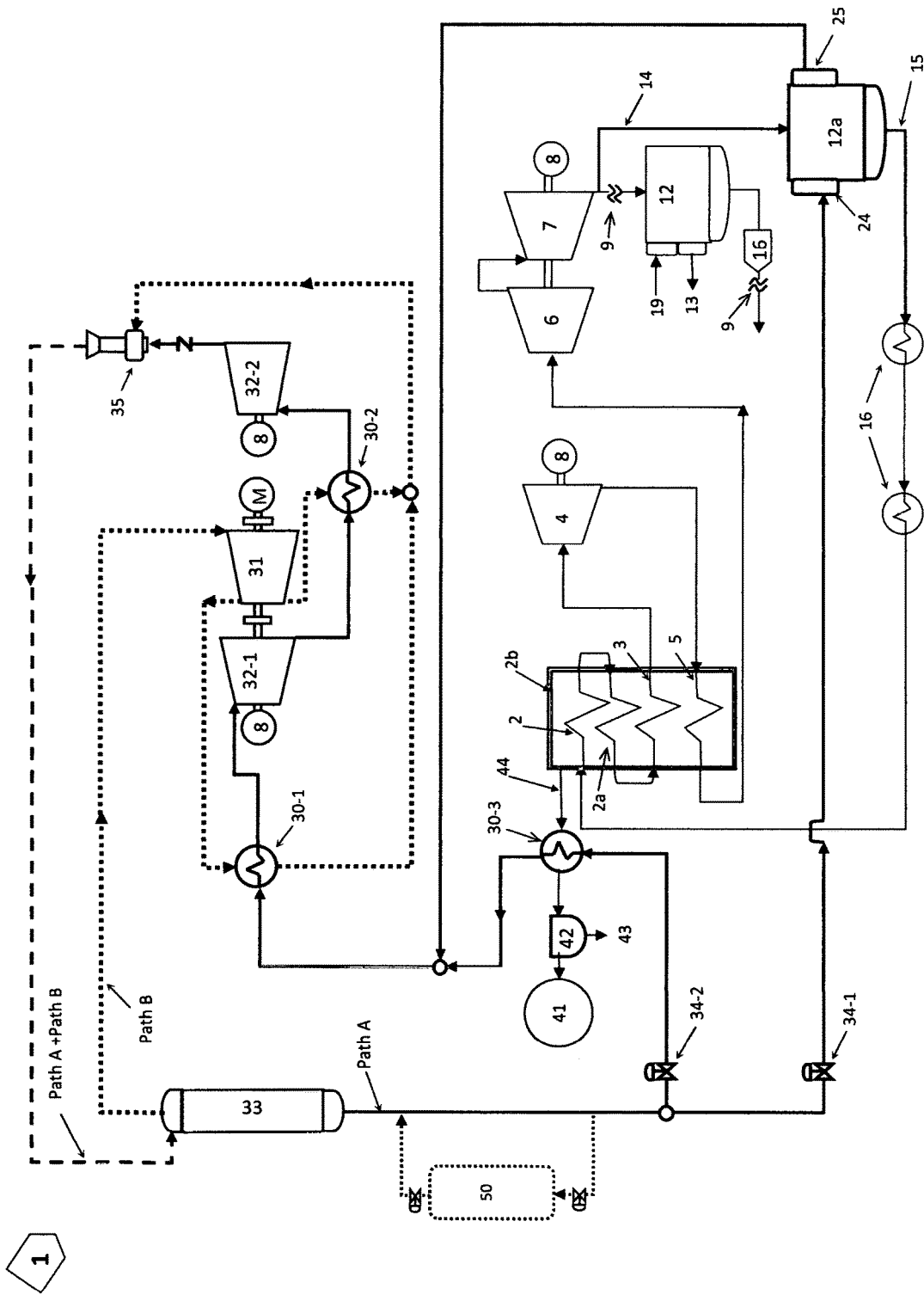
FIG. 1 depicts an embodiment of the present invention to capture power plant rejected heat to produce additional electric power. The normal plant Rankine cycle is illustrated in thin black lines with feedwater heater train 16, economizer 2, boiler 2a, boiler enclosure 2b superheater 3, high pressure turbine 4, reheater 5, intermediate pressure turbine 6, low pressure turbine 7, electric generators 8, and water cooled condenser 12. The conventional condensate, boiler feedwater, and condenser 12 cooling water pumps are omitted for clarity. The superimposed binary $CO_2$ cycle is illustrated in heavier solid and dotted black lines. Rankine cycle condenser 12 is removed from the cycle as depicted by cut-lines 9 and replaced by $CO_2$ cycle condenser 12a to capture this rejected heat. Condenser 12a is depicted with steam inlet piping 14 from turbine 7 exhaust, refrigerate inlet headers 24, refrigerate outlet headers 25, codensate piping 15 routed to feedwater heater train 16, and refrigerate temperature control valve 34-1. In a second loop, heat exchanger 30-3 is added to boiler gas exhaust duct 44 with refrigerate temperature control valve 34-2 to capture rejected heat before exhausting it to the atmosphere through stack 41. The refrigerate from these two loops is recombined before routing to heat exchanger 30-1.
Figure 2:
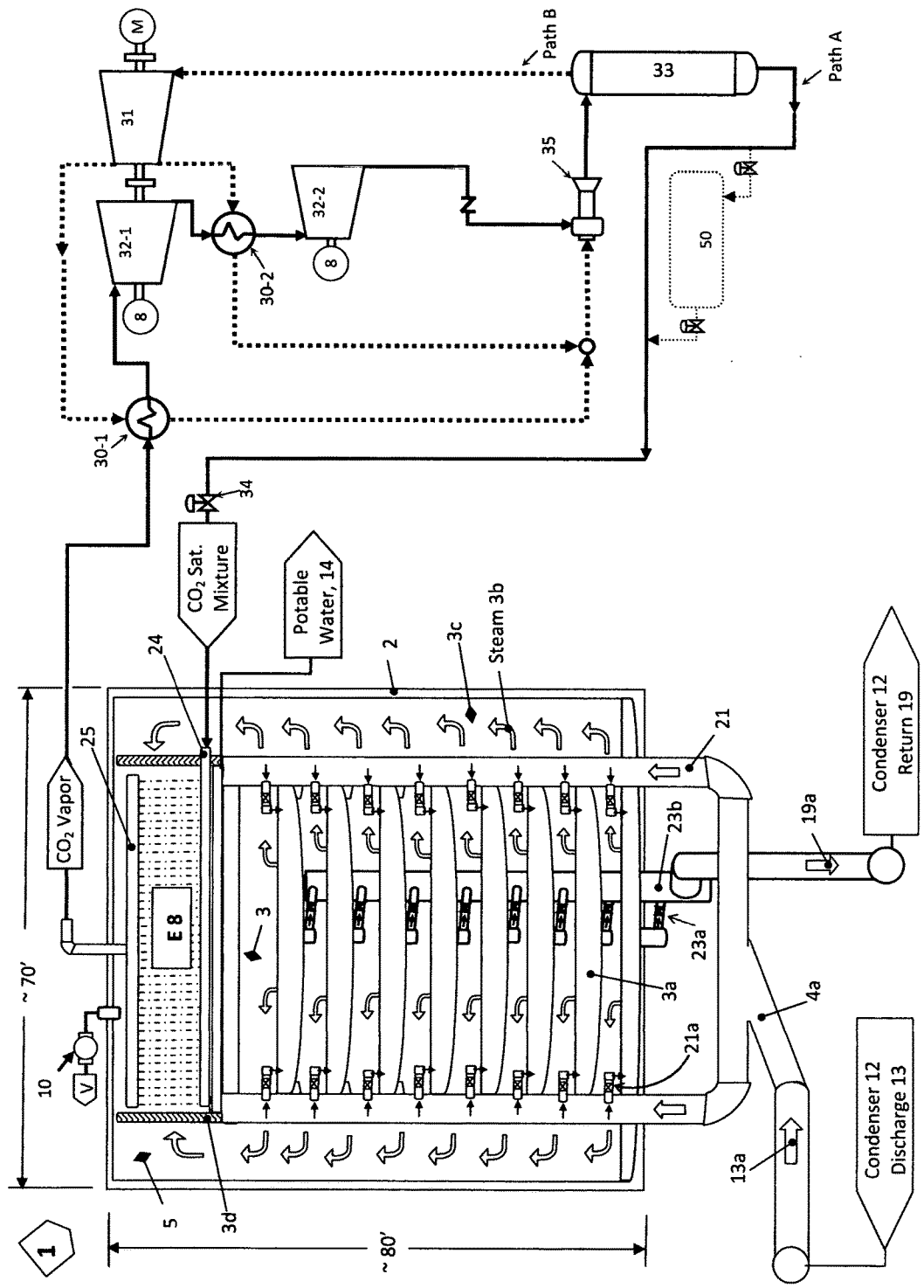
FIG. 2 depicts an embodiment of the present invention to capture power plant rejected heat to produce additional electric power and desalinated water. Flash tower 2 is included with multiple levels of steam flash trays 3a to reduce footprint area. In this application, normal plant condenser 12 is kept in-place and flash tower 2 and trays 3a are supplied with warm cooling water discharge 13 from condenser 12 by the existing plant cooling water pump. Condenser-evaporator E8 is located in the top section of flash tower 2.

The process is similar in relation to electric power production in both FIGS. 1 and 2 with each including separator 33, compressor 31, turbine 32-1 and 32-2, electric generators 8, heat exchangers 30-1 and 30-2, and ejector 35. The processes differ in that FIG. 1 heat exchanger 30-1 receives $CO_2$ vapor from condenser 12a, which is superimposed into the Rankine cycle, and from stack gas heat exchanger 30-3. In FIG. 2 $CO_2$ vapor to heat exchanger 30-1 is supplied from condenser-evaporator E8 in flash tower 2, formed by condensing flashed steam from Rankine cycle condenser 12 cooling water discharge 13.

FIG. 1 illustrates condenser 12a superimposed into the Rankine cycle. Since the $CO_2$ can enter condenser 12a in a mixed phase condition, it is necessary to arrange the surface in one pass with the tubes sloped upwards from inlet header 24 to outlet header 25. The total surface conductance of condenser 12a is relatively high because of the condensing steam film conductance on the outside of the tubes and boiling film conductance on the inside of the tubes. Stack gas exchanger 30-3 may be arranged in one refrigerate vertical up-flow-pass with horizontal cross flow stack gas, allowing for collection and removal of condensed stack gas vapor by trap 42 to waste disposal. These exchangers may have other arrangements.

FIG. 2 illustrates flash tower 2 divided into two sections with the lower section serving as steam flash area 3, and the upper section 5 serving as $CO_2$ evaporator-steam condensing area. Warm water piping 4a is directly connected to flash area 3 via columns 21. Direct connection of piping 4a allows for increasing the height of tower 2 in proportion to the positive pressure head available from the plant's condenser cooling water pumps or other pumps that may be included with this or other processes. A higher tower 2 allows for more tray 3a levels and more desalinated water and power output per footprint area.

For applications using natural circulation, warm water is supplied to a nearby reservoir, which is open to the atmosphere via a vent, so that the difference between atmospheric pressure and vacuum pressure inside tower 2 causes the water to be forced upwards to a level equivalent to about 33 feet, which facilitates the supply of warm water to columns 21 and stacked flash trays 3a. Optionally, compressed gas may be introduced at the reservoir vent to produce more than 33 feet of head.

In flash tower 2, cooling water 13a is boiled at low vacuum pressure and corresponding saturation temperature, which is lower than the water inlet temperature. The boiling water takes its energy for heat of vaporization from the remaining water and reduces its temperature to saturation temperature for discharge through downcomer 23b at a lower temperature than the water inlet temperature 13a.

Cooling water 13a entering flash tower 2 may be sea water, brackish water, river, or lake water. A fraction of this water is distilled from vapor and may be used as potable water 14.

Flash area 3 and upper section 5 are sealed from the atmosphere and operate under vacuum pressure. Vacuum pump 10 serves to create the initial vacuum and then to intermittently vent non-condensable gasses. Vacuum pressure is maintained during operation as the condensing saturation temperature of the steam since the steam collapses into water and occupies less volume, causing the vacuum to be maintained.

From column 21, the warm water 13a enters flash trays 3a through connecting piping and valves 21a, which control tray 3a water level using water level measuring and control instruments. The entering water 13a boils at the saturation temperature of the vacuum pressure, taking its heat of vaporization energy from the water and cooling it to saturation water temperature. Steam 3b flashed in trays 3a is depicted by the white-filled curved arrows on FIG. 2. Steam 3b exits trays 3a, enters up-flow section 3c, passes through moisture separators 3d, and enters heat exchanger E8. The cooled water 19a is shown exiting the center of trays 3a through connecting piping and valves 23a into downcomer 23 for exiting tower 2 and returning to condenser 12 through piping 19. Valves 23a control tray 3a outlet temperature via instruments and controls.

$CO_2$ evaporator-steam condenser heat exchanger E8 is shown as one upward vertical pass of $CO_2$ with cross-flowing of steam around a 360 degree periphery, but it can have various arrangements. The water from condensed steam is collected in an under-pan as potable water 14. The total surface conductance of exchanger E8 is relatively high because of the condensing steam film conductance on the outside of the tubes and the boiling film conductance of $CO_2$ inside the tubes.

Integrating the desalination feature with a 200 megawatt power plant would require the diameter of tower 2 to be approximately 70 feet as set by the maximum allowable steam velocity leaving the water surface of 15 feet per second. The total height of tower 2 from its base to top would be about 80 feet as set by the required tray geometry. Marked FIG. 4 shows that about 2% of the plant's cooling water is flashed into steam, resulting in a desalinated water output of about 1 million pound per hour, equivalent to 9.3 acre-foot/day, or 11,500 cubic meters/day. Average size desalination plants range between 5,000 and 10,000 cubic meters/day.

Both FIGS. 1 and 2 schematically illustrate the $CO_2$ flow paths. $CO_2$ flows in parallel paths A and B through process 1 at two different pressure levels and sets of conditions with the only common mixing point being at ejector 35 and moisture separator 33, where their mixed conditions create a quality mixture, which correspondingly separates the mixture into a ratio of saturated liquid path A and vapor path B.

An example cycle follows to demonstrate the process for producing desalinated water and electricity with reference to marked FIGS. 3 and 4. Referring to FIG. 3 and starting with separator 33, marked as a single point (1) at 975 psia and 50% quality mixture, the separated saturated liquid (path A) is marked with a solid heavy-weighted black line as it discharges separator 33 at point 2A, flows through throttle valve 34 to the inlet of evaporator E8 (3A) as a low quality saturated mixture at 63° F., and then flows through evaporator E8 absorbing the steam heat of condensation. It exits as a vapor (4A) to exchanger E 30-1 for superheating (4A to 5A), followed by isentropic expansion in turbine 32-1 (5A to 6A). It exhausts to exchanger 30-2 for reheating (6A to 7A), followed by isentropic expansion through turbine 32-2 (7A to 8A) before it exhausts at 85 psia via ejector 35 for return to separator 33 (8A to 1). Path B is marked by a short-dotted, heavy-weighted black line flowing as saturated vapor from separator 33 (1 to 2B) to compressor 31(2B to 3B). Path B exits compressor 31 as a superheated supercritical pressure fluid at 3900 psia pressure and splits into two mass flow streams to transfer its heat to path A as it passes through the two stages of heat exchangers (E 30-1 and E 30-2). Path B recombines (4B) and flows to ejector 35 as the motive stream to induce path A flow from turbine exhaust 32-2 (4B to 1). Path A and B mix in ejector 35, compressing path A and discharging to separator 33, resulting in a 50% quality mixture for re-splitting into path A and B, completing their cycles.

Referring to FIG. 4, sub-cooled water at 85° F. near 14.6 psia pressure is introduced to flash tower 2 operating at 0.3 psia pressure. The water boils and about 2% is flashed into steam, which is removed as desalinated water in evaporator 8 where it is condensed as it transfers its heat of condensation to vaporize path A, and the remaining 98% water discharges flash tower 2 at 65° F., corresponding to saturation temperature at 0.3 psia.

Referring to FIG. 2, path A is shown as a solid heavy-weighted black line discharging as a saturated liquid from the bottom of separator 33 and flowing to throttle valve 34 and to inlet header 24 of exchanger E8. Path B is shown as short-dotted, heavy-weighted black line discharging from the top of separator 33 as a vapor and entering compressor 31, where it is compressed to 3900 psia/250° F. supercritical fluid. Compressor 31 heat of compression (HOC) superheats path B, which discharges and splits into two mass flow streams for transferring its heat to path A in superheater exchanger 30-1 and reheat exchanger 30-2. Path B exits exchangers 30-1 and 30-2 as a sub-cooled liquid and mixes before entering ejector 35 as the motive stream to induce path A from turbine 30-2 exhaust.

Path A $CO_2$ saturated liquid pressure is throttled to 63° F. temperature by valve 34 before it flows through the evaporators, in this case exchanger E8, absorbing the steam heat of condensation from flash steam 3b, converting path A to saturated vapor. Path A exits exchanger E8 and flows through heat exchanger 30-1 where it is converted to 230° F. superheated vapor by heat transferred from path B. Path A then flows to superheat turbine 32-1, where it is isentropically expanded to superheated vapor at 150 psia/45° F. Path A then flows through heat exchanger 30-2, where it is reheated to 192° F. superheated vapor. It then enters reheat turbine 32-2, where it isentropically expands to 85 psia/120° F. superheated vapor and exhausted to the suction connection of ejector 35.

Path B transfers heat to path A in exchangers 30-1 and 30-2 before it enters ejector 35 as the motive stream for path A. Ejector 35 is designed with various ratios of motive flow to induced flow to compress Path A, in this case, resulting in a pressure regain to 975 psia entering separator 33. The combination of path A and B through ejector 35 is shown as a broadly-dotted, heavy-weighted black line leaving ejector 35 resulting in vertical separator 33 conditions at a 50% quality mixture.

Ejector 35 considerably reduces the power consumption of compressor 31 since the pressure in path B is compressed to 3900 psia from separator 33 outlet pressure of 975 psia and not reheat turbine 32-2 exhaust pressure of 85 psia. Ejector 35 is available as current technology, but it has not been used in a power generation cycle as disclosed in this invention. Path B serves as the motive stream for ejector 35 in which it flows through an internal converging nozzle to increase its velocity and cause a sufficiently low pressure to be created at the inlet connection for path A. Path A and B mix in ejector 35 followed by flow through a diverging nozzle to help regain about 25% of path B initial inlet static pressure.

The ternary cycles shown are examples to demonstrate process 1 and may be modified to suit design conditions of manufacturers, including operating pressures and temperatures, design of turbines for other exhaust pressures or splitting path B into other mass flow proportions. As may be noted by the example cycle marked on FIG. 3, compressor 31 enthalpy of compression (~22 BTU/lb) is considerably less than the total enthalpy of expansion (~40 BTU/lb) provided by turbines 32-1 and 32-2, which is equivalent to recovering about 45% of rejected heat and resulting in a combined plant thermal efficiency of about 70%.

$CO_2$ storage and startup unit 50, shown in dotted, light-weighted black lines, provides startup and shutdown services by receiving path A liquid during load reductions or shutdowns, and supplying path A liquid during startups or load increases. Unit 50 maintains path A $CO_2$ liquid condition by holding pressure and temperature during storage. Automatic $CO_2$ mass flow adjustments are facilitated from unit 50 to or from path A for each load change.

What is claimed is:

1. A method of producing electric power and potable water, the method comprising:

extracting a heat content from a low temperature heat source, the low temperature heat source comprising one of water, steam, a gas, or a solid;

indirectly transferring said heat content to a process refrigerate within a condenser-evaporator, wherein the process refrigerate enters the condenser-evaporator as a sub-cooled, saturated, or low quality mixture fluid;

directing the process refrigerate from the condenser-evaporator to a first path as a first path vapor;

superheating the first path vapor in at least one heat exchanger;

directing the superheated first path vapor to at least one turbine for expansion and producing work;

drawing the expanded first path vapor into at least one ejector, wherein the at least one ejector compresses and directs the first path vapor to at least one liquid-vapor separator;

separating a mixed fluid in said at least one liquid-vapor separator into a saturated liquid and a saturated vapor;

returning said saturated liquid from the at least one liquid-vapor separator to the condenser-evaporator as the process refrigerate of the first path, thereby completing a first path cycle;

directing said saturated vapor from the at least one liquid-vapor separator to a second path as a second path vapor;

elevating said second path vapor to a supercritical pressure and temperature in at least one compressor forming a supercritical second path vapor;

supplying the supercritical second path vapor to the at least one heat exchanger, such that heat from the supercritical second path vapor is transferred to the first path and the supercritical second path vapor exits the at least one heat exchanger as supercritical second path liquid; and merging the supercritical second path liquid with the first path vapor in said at least one ejector to form the mixed fluid in the at least one liquid-vapor separator, thereby completing a second path cycle.

2. The method according to claim 1, wherein said low temperature heat source is a non-potable water and the method further comprising:

introducing said non-potable water to a flash tower operating at vacuum pressure, wherein said condenser-evaporator is arranged in an overhead space of said flash tower;

flashing a portion of said non-potable water in the flash tower into a saturated steam;

condensing said saturated steam on an outer surface of said condenser-evaporator, thereby producing potable water and a heat of condensation;

transferring said heat of condensation, serving as said heat content, to the process refrigerate within the condenser-evaporator; and returning remaining non-potable water to a source thereof.

3. The method according to claim 2, wherein the source of said non-potable water comprises one of sea water, brackish water, a cooling water of a power plant condenser, a solar heated pond, and a geothermal source.

4. The method according to claim 2, wherein said non-potable water in the flash tower is collected in at least one flash tray.

5. The method according to claim 4, wherein said flash tower operating at vacuum pressure flashes steam from a portion of the non-potable water collected in the at least one flash tray while lowering a temperature of the remaining non-potable water in the at least one flash tray.

6. The method according to claim 5, wherein said at least one flash tray comprises an array of stacked flash trays.

7. The method according to claim 2, wherein a vacuum pump or ejector device serves to create initial vacuum in the flash tower and intermittently remove non-condensable vapor, wherein the operating vacuum pressure is created when the saturated steam condenses to a saturated liquid occupying less volume.

8. The method according to claim 1, wherein the low temperature heat source is a cooling air of a power plant condenser.

9. The method according to claim 1, wherein the low temperature heat source is an exhaust gas of a boiler and the condenser-evaporator is disposed in an exhaust stack such that the heat content is indirectly transferred to the process refrigerate as said exhaust gas contacts the condenser-evaporator.

10. The method according to claim 1, wherein said process refrigerate is $CO_2$ or any refrigerate that normally vaporizes at a temperature lower than a source temperature of the low temperature heat source.

11. The method of claim 1, wherein the at least one heat exchanger comprises a plurality of heat exchangers and the at least one turbine comprises a plurality of turbines, such that each heat exchanger of the plurality of heat exchangers directs superheated first path vapor into a corresponding turbine of the plurality of turbines in alternation, the method further comprising:
   splitting the second path at an outlet of the at least one compressor, wherein a portion of the supercritical second path vapor is supplied to each of the plurality of heat exchangers, such that heat from the supercritical second path vapor is transferred to the first path and the supercritical second path vapor exits each of the plurality of heat exchangers as supercritical second path liquid; and
   recombining the supercritical second path liquid from said plurality of heat exchangers before merging with the first path vapor in said at least one ejector.

12. The method according to claim 1, further comprising implementing the method as a retrofit in an existing power plant.

* * * * *